March 1, 1955     H. PENWELL     2,703,255

MAGNETIC SUN VISOR

Filed Oct. 13, 1952

Harold Penwell
*INVENTOR.*

United States Patent Office 2,703,255
Patented Mar. 1, 1955

2,703,255
MAGNETIC SUN VISOR

Harold Penwell, Dallas, Tex.

Application October 13, 1952, Serial No. 314,496

2 Claims. (Cl. 296—97)

The present invention relates to a magnetic sun visor and it consists in the combinations, constructions and arrangements of parts herein described and claimed.

Generally there is provided a sun visor with a novel mounting whereby the same will present itself at all times in a position where it guards the eyes of a driver of a vehicle from the sun regardless of the direction in which the vehicle is turned. A simple adjustment means is provided as a part of the invention whereby the device may be adjusted whenever necessary from time to time.

It is accordingly an object of the invention to provide a sun visor which is magnetically directed to a proper position regardless of the position of the vehicle in which the same may be mounted.

Another object of the invention is the provision, in a device of the character set forth, of novel adjustment means forming a part of the invention.

Another object of the invention is to provide a device of the character set forth which is simple in construction, inexpensive to manufacture and yet effective and efficient in use.

Other and further objects of the invention will become apparent from a reading of the following specification taken in conjunction with the drawing, in which.

Figure 1:
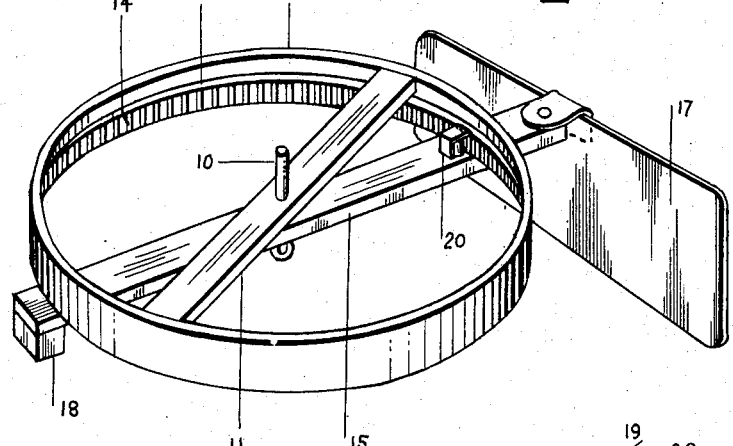
Figure 1 is a perspective view of an embodiment of the invention.
Figure 2:
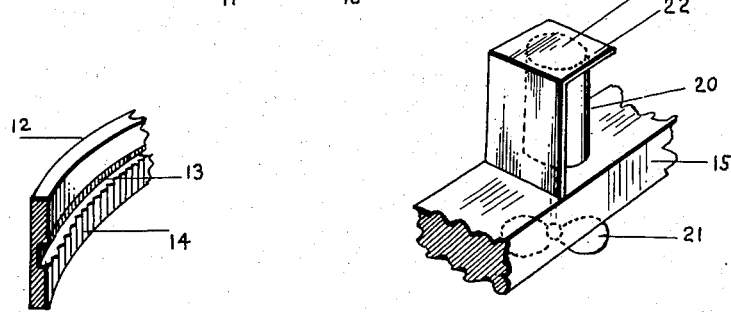
Figure 2 is a fragmentary perspective view of a portion of a ring forming a part of the invention.
Figure 3:
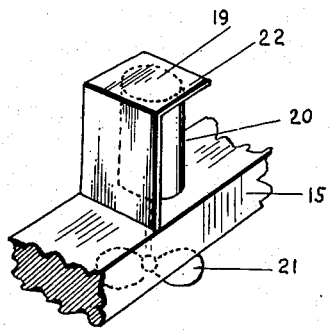
Figure 3 is an enlarged fragmentary perspective view of a clip forming a part of the invention.

Referring more particularly to the drawing, there is shown therein a vertically extending pivot pin 10 which may be attached to the roof of a vehicle directly above the head of the driver of such vehicle and which has revolubly mounted thereon a diametrically extending magnet 11 to the outer ends of which is attached a ring 12. The ring 12 is provided centrally upon the inner face thereof with a groove 13 and with gear teeth 14 in the lower portion of such inner face.

An arm 15 is pivotally mounted upon the lower end of the pin 10 and extends diametrically at each of its ends for short distance beyond the ring 12 and has affixed at one end thereof a sun visor 17 preferably formed of a light plastic material and at its other end is provided with a counterbalancing weight 18 which is adapted to balance the weight of the visor 17.

Affixed to the upper side of the arm 15 by means of a vertically extending pin 19 which extends through the arm 15 adjacent the inner face of the ring 12 is a gear 20 which is adapted to enmesh with the teeth 14 and the pin 19 is provided at its lower end with a wing nut 21 whereby to tighten the gear 20 in any position desired with respect to the teeth 14. A clip member 22 is also tightened in position by means of the wing nut 21 and the free end of the clip 22 is adapted to engage at all times in the groove 13.

In operation, it will be apparent that the visor 17 may be set in any particular position with respect to the ring 12 and that thereafter the same is suspended as a unit along with the magnet 11. It will also be understood that the magnet 11 will point to magnetic north with one of its ends at all times and that therefore the visor 17 will be presented in any selected position with regard to the driver's eyes regardless of the turning of the vehicle. Of course, from time to time due to the changing of the position of the sun and to other factors affecting the magnet 11, it may be necessary to adjust the position of the visor 17 with respect to the ring 12 and this is accomplished by means of the gear 20 as aforesaid. Instead of the gear 20 a rubber friction wheel may be utilized.

While but one form of the invention has been shown and described herein, it will be readily apparent to those skilled in the art that many minor modifications may be made without departing from the spirit of the invention or the scope of the appended claims.

What is claimed is:

1. A device of the character described comprising a vertical pin adapted to be affixed dependently in the roof of a vehicle above the head of the operator thereof, a circular body, a horizontally and diametrically extending bar magnet attached at each of its ends to said body and centrally pivoted upon said pin, a horizontal bar pivoted upon said pin and having its ends extending outwardly beneath said body, a sun visor carried by one end of said bar, and a counterweight for said visor carried by the other end of said bar.

2. A device as defined in claim 1 wherein latching means is carried by said bar and selectively engageable with the periphery of said body.

References Cited in the file of this patent

UNITED STATES PATENTS

| 106,735 | Smith | Aug. 23, 1870 |
| 1,217,937 | Greene | Mar. 6, 1917 |
| 2,518,766 | Exner | Aug. 15, 1950 |

FOREIGN PATENTS

| 355,242 | Great Britain | Aug. 17, 1931 |